United States Patent [19]

Elliott et al.

[11] 4,156,350

[45] May 29, 1979

[54] REFRIGERATION APPARATUS DEMAND DEFROST CONTROL SYSTEM AND METHOD

[75] Inventors: Marvel A. Elliott; Donald L. Sidebottom, both of Louisville, Ky.

[73] Assignee: General Electric Company, Louisville, Ky.

[21] Appl. No.: 864,971

[22] Filed: Dec. 27, 1977

[51] Int. Cl.² ............................................. F25D 21/00
[52] U.S. Cl. ........................................ 62/80; 62/234; 62/155
[58] Field of Search .................. 62/234, 155, 80, 158, 62/154

[56] References Cited

U.S. PATENT DOCUMENTS

| | | | |
|---|---|---|---|
| 2,091,884 | 8/1937 | Rottner | 62/4 |
| 2,888,808 | 6/1959 | Jacobs | 62/155 |
| 3,321,928 | 5/1967 | Thorner | 62/140 |
| 3,460,352 | 8/1969 | Lorenz | 62/153 |
| 3,518,841 | 7/1970 | West | 62/153 |
| 3,553,975 | 1/1971 | Sakamoto | 62/156 |
| 3,759,049 | 9/1973 | Bell et al. | 62/80 |
| 3,890,798 | 8/1974 | Fujimoto | 62/155 |

*Primary Examiner*—William E. Wayner
*Assistant Examiner*—Harry B. Tanner
*Attorney, Agent, or Firm*—Radford M. Reams; Frederick P. Weidner

[57] ABSTRACT

A demand defrost control system which bases the interval between future defrosting operations on the time (heater ON time) required for the defrost heater to raise the evaporator temperature to a predetermined temperature during a previous defrosting operation. There is an inverse relationship between heater ON time and defrost intervals. Additionally, an override is provided which measures the time the compressor and evaporator are energized during any single operation cycle. If this time exceeds a predetermined length of time, the interval before the next defrosting operation is shortened.

6 Claims, 1 Drawing Figure

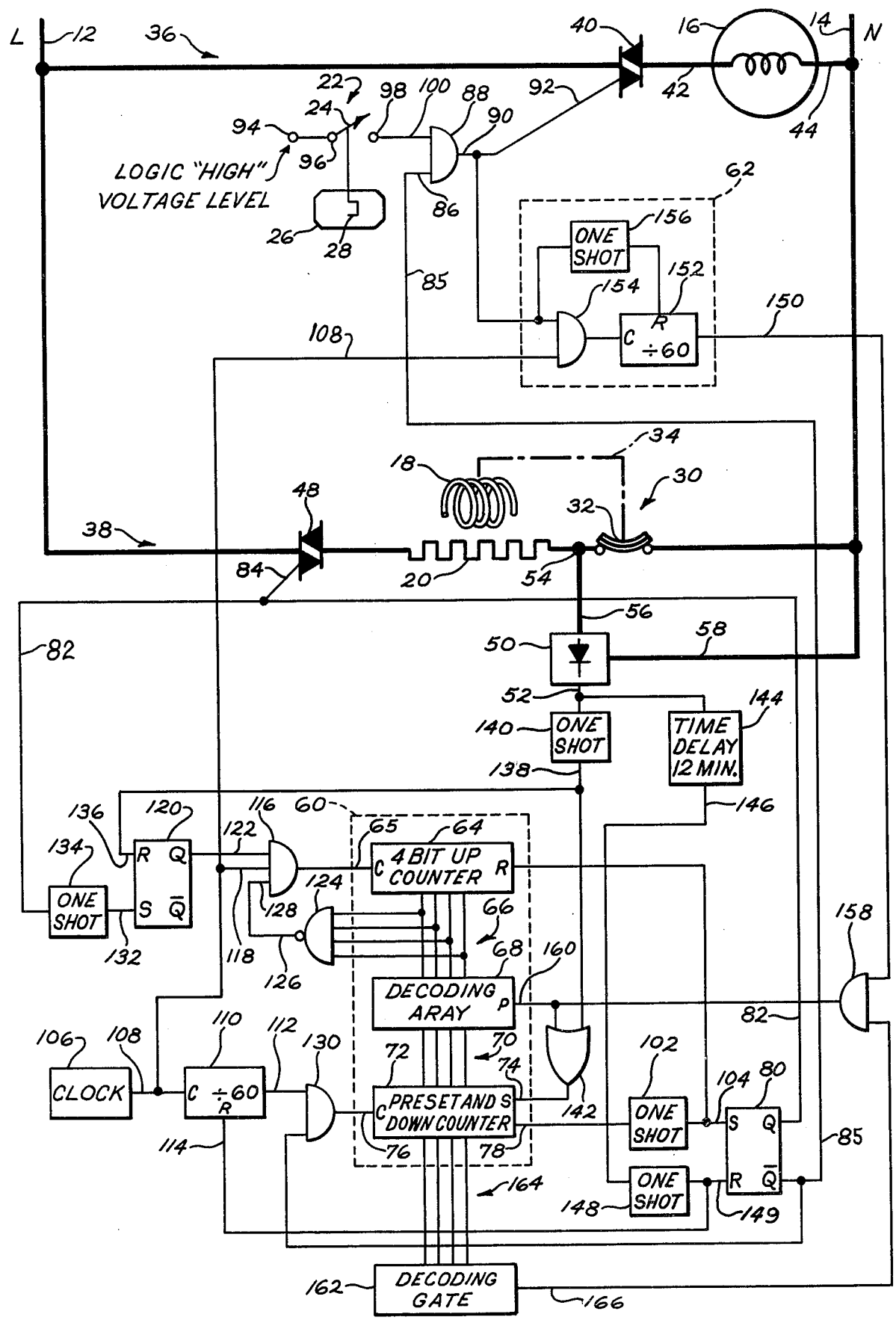

REFRIGERATION APPARATUS DEMAND DEFROST CONTROL SYSTEM AND METHOD

CROSS-REFERENCE TO RELATED APPLICATION

A co-pending application, also entitled "Refrigeration Apparatus Demand Defrost Control System and Method," Ser. No. 864,972, filed Dec. 27, 1977, concurrently herewith, by Robert B. Brooks, and assigned to General Electric Company, the assignee of the present invention, describes and claims an invention which, in some respects, is a specific embodiment of certain aspects of the present invention.

BACKGROUND OF THE INVENTION

The present invention relates to a demand defrost control system for a refrigeration apparatus.

Defrost controllers for automatically-defrosting refrigerators periodically interrupt operation of the refrigeration system and energize a heater to defrost the refrigerant evaporator. It has been recognized that maximum energy efficiency may be realized if the interval between automatic defrosting operations is varied according to actual need. Control systems which attempt to vary the interval between defrosting operations according to actual need are generally termed "demand defrost" systems. If successfully implemented, the result is energy savings with no decrease in performance.

One approach to a demand defrost system is to measure the actual amount of frost buildup on the refrigerant evaporator, and to initiate an automatic defrosting operation when the frost buildup becomes excessive. Systems attempting this approach have for example employed mechanical probes, photoelectric sensors, airflow impedance sensors, or sensors responsive to temperature differences between parts of the refrigeration system.

Direct measurement of frost buildup has proved to be difficult, and various predictive type demand defrost systems have been developed as an alternative. Predictive type systems have taken into account such parameters as ambient humidity, refrigerator door openings and total accumulated compressor running time to predict the rate of frost buildup on the evaporator and thus the required time interval between successive automatic defrosting operations.

Any single predictive approach, such as taking into account ambient humidity, may by itself lead to significant inaccuracies. However, by combining several such approaches in a comprehensive system with appropriate weighting of their individual effects, good results may be obtained under most conditions of usage.

The present invention is one approach to a predictive demand defrost system. The invention may be used either by itself, or in combination with other approaches in a comprehensive system. The present invention itself comprehends two separate approaches, one of which may be employed as an override for the other.

In one particular prior art defrost control system, there is a defrost control timer having a cam-operated switch. The arrangement is such that the switch is in a normal position for approximately six hours of timing motor running time, and in a defrost position for approximately twenty minutes of timing motor running time. When the cam-operated switch is in a normal position, energization of the refrigeration system compressor occurs whenever called for by the refrigerator thermostat. In the defrost position, the refrigeration compressor is de-energized and a heater for defrosting the evaporator is energized. This particular prior art system additionally includes a thermal sensor which is responsive to a predetermined evaporator temperature, for example 50° F., being reached during a defrosting operation. When the predetermined temperature is reached, the heater is de-energized even though the cam-operated switch remains in the defrost position. In most cases, the predetermined temperature is reached before the end of the twenty-minute defrost duration period, and there is a period of time, known as defrost "dwell time," during which neither the refrigeration compressor nor the defrost heater is energized. Such a time delay between de-energi ation of the heater and restarting of the compressor lessens the starting load on the compressor by permitting a decrease in evaporator temperature with a consequent decrease in refrigerant pressure.

In this particular prior art defrost control system, the timing motor is connected to operate only when the refrigerator temperature control thermostat is calling for cooling and energizing the refrigerant compressor. Thus the defrost control timer effectively accumulates compressor running time (with the exception of periods during a defrosting operation when the thermostat is calling for cooling but energization of the compressor is prevented by the defrost control timer). This will be recognized as a form of predictive type demand defrost control system, taking into account the parameter of accumulated compressor running time.

SUMMARY OF THE INVENTION

Accordingly, it is an object of the invention to provide a predictive type demand defrost control system for a refrigeration apparatus.

It is another object of the invention to provide an approach to a demand defrost control system which may either stand alone or be employed in combination with one or more other approaches in a comprehensive refrigerator demand defrost control system.

It is yet another object of the invention to provide an override for a demand defrost control system which may be employed in combination with the basic approach of the present invention.

Briefly stated, and in accordance with an important aspect of the invention, a refrigeration apparatus demand defrost control system includes a means for de-energizing the refrigerant compressor (and thus the refrigerant evaporator) and for energizing the evaporator defrosting heater upon initiation of a defrosting operation. A thermal sensor is responsive to a predetermined evaporator temperature being reached during a defrosting operation. The demand defrost control system further includes a means for establishing varying intervals between successive defrosting operations and for initiating a defrosting operation at the end of an interval. This last-mentioned means has a timer means responsive to the energization of the heater and to the thermal sensor. The timer means measures the time required for the heater to raise the evaporator temperature to the predetermined temperature during the defrosting operation. It is assumed that for relatively heavy frost buildups on the evaporator, a relatively long heater time is required. Conversely, for light evaporator frost buildups, the predetermined temperature is reached after a relatively shorter period of time. In response to this measured time, the interval before the next defrosting operation is selected, the interval before the next defrosting operation being inversely related to the time required for the heater to raise the evaporator temperature to the predetermined temperature during the previous defrosting operation.

Preferably, and as is conventional in refrigerator defrosting systems, as soon as the predetermined evaporator temperature is reached the defrost heater is de-energized and the defrost "dwell time" begins. Thus, the time required for the heater to raise the evaporator temperature to the predetermined temperature may also be expressed as "heater ON time." For convenience, the phrase "heater ON time" is employed hereinafter, and will be understood to mean the time required to raise the evaporator to the predetermined temperature.

In addition to using the heater ON time for just one defrosting operation to determine the interval before the next defrosting operation, the concept of the invention includes the possibility of taking into account the heater ON times for a number of previous defrosting operations. The relative influences should be weighted, with the last previous heater ON time having more influence on the next defrost interval than those farther in the past.

Thus, the interval between successive defrosting operations in the future is based at least in part on a history of at least one previous defrosting operation. Specifically, the heater ON time during at least the last previous defrosting operation determines the next defrost interval.

Since the above-described procedure employs information based on past defrosting operations to predict future defrosting needs, errors can occur, particularly when the conditions of refrigerator usage change significantly within a relatively short period of time. An example of such a change would be if a user of the refrigerator returns from an absence during summer months when ambient conditions are fairly humid. During the absence, the refrigerator door would remain closed and relatively little frost would build up on the evaporator. The demand defrost control system would accordingly be predicting light frost buildup in the future and would be extending the intervals between successive defrosting operations. When the user returns and begins frequent door openings under the relatively high ambient humidity conditions, frost would build up on the evaporator at a fairly rapid rate and become excessive before a defrosting operation occurs. When frost buildup on an evaporator is excessive, efficiency is greatly reduced for at least two reasons. First, the frost layer acts as thermal insulation interferring with the removal of heat from the refrigerator compartment by the evaporator. Second, in a forced-air refrigerating system, air passageways among the coils of the evaporator become partially or fully blocked, degrading the efficiency of the air circulation system.

To overcome this particular problem, an override of the above-described predictive type demand defrost system is provided. In the refrigerator, a thermostatic control sensitive to the temperature of the compartment cooled by the evaporator cycles the compressor, and thus the evaporator, ON and OFF as required to maintain a preset temperature in the refrigerated compartment. In accordance with the override aspect of the invention, the time during which the compressor and thus the evaporator are continuously energized during any single ON cycle is measured and compared against a predetermined length of time. A typical predetermined length of time is one hour. In the event the predetermined length of time is exceeded, it is assumed that evaporator efficiency is being impaired due to excessive frost buildup, and a relatively shorter interval before the next defrosting operation is selected, overriding whatever defrost interval the demand defrost system would otherwise have called for.

It will be appreciated that due to the general nature of this second aspect of the invention, it may be employed either in combination with the first aspect of the present invention, or in combination with a completely different type of demand defrost system.

In accordance with the method aspect of the invention, a method of controlling the interval between successive defrosting operations in an automatically-defrosting refrigeration apparatus includes the steps of initiating a defrosting operation by de-energizing the refrigerant evaporator and energizing an evaporator heater; sensing the temperature of the evaporator during the defrosting operation; measuring the time required for the heater to raise the evaporator temperature to a predetermined temperature; and establishing the interval before the next defrosting operation based at least in part on the measured time, the interval before the next defrosting operation being inversely related to the measured time.

This method may further include the steps of determining the length of time the evaporator operates continuously in response to the refrigerator thermostatic temperature control to cool a refrigerated compartment, and shortening the interval before the next defrosting operation in the event the length of time so determined exceeds a predetermined length of time. This latter aspect of the method may be employed either in combination with the basic demand defrost method disclosed herein, or in combination with some other demand defrost method.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawing, in which:

The single FIGURE is an electrical schematic circuit diagram of a refrigerator defrost control system embodying the present invention.

DETAILED DESCRIPTION OF THE PREFERRED EMBODIMENT

Preliminarily, it should be noted that the particular embodiment described hereinafter is intended to illustrate one way of implementing the general concepts of the invention, and is not intended to limit the scope of the claimed invention. It will therefore be appreciated by those skilled in the art that many alternative embodiments may be constructed, including embodiments employing electronic circuitry as in the illustrated embodiment, or employing electromechanical timing elements and relays. It will further be appreciated that the present invention may also be embodied as one or more elements of a suitably-programmed microprocessor control system.

While the present invention is applicable to the control of any refrigeration apparatus in which the evaporator is subject to frost buildup, it will be particularly described with reference to a refrigeration apparatus associated with a household refrigerator. The specific type of refrigerator to which the present demand defrost control concept is applied is the "frost-free" type which includes a refrigerant evaporator positioned in a chamber separate from the food storage compartments and which further includes a fan for circulating air over the evaporator. This general arrangement may be applied to refrigerators for fresh food storage, to freezers, or to combination refrigerator/freezers.

Referring now to the drawing, the single FIGURE is an electrical schematic diagram of a refrigerator circuit 10 including an exemplary embodiment of the invention. L and N supply conductors 12 and 14 are supplied from a suitable source of AC power, for example a conventional power plug (not shown). In the circuit 10, those conductors which are connected to the source of AC power are shown as heavy lines, and the remaining conductors, which carry low level digital logic signals, are shown as relatively lighter lines.

Included as portions of a conventional closed circuit refrigeration system in the refrigerator are a refrigerant compressor motor 16 and a refrigerant evaporator 18. It will be appreciated that when the compressor motor 16 is energized, the evaporator 18 is thereby also energized by being supplied with liquid refrigerant.

In order to rapidly defrost the evaporator 18 when required, a heater 20 is provided. Preferably, the heater 20 is of the radiant type and comprises an extended electrical heating element enclosed in a transparent quartz tube.

To control the temperature within the refrigerator by cycling the compressor motor 16 (and therefore the evaporator 18) ON and OFF as required, a thermostatic control 22 in the form of a thermostatic control switch 24 is provided. The thermostatic control switch 24 closes when refrigeration is required to maintain a set temperature, and opens when refrigeration is not required. A box represents a refrigerated compartment 26 of the refrigerator. It will be appreciated that the compartment 26 is cooled by the evaporator 18 and that an element 28 of the thermostatic control 22 projects sufficiently into the compartment 26 to respond to the temperature therein.

The circuit 10 further includes a thermal sensor 30 in the form of a thermal switch 32 which is responsive to the temperature of the evaporator 18. Specifically, the thermal sensor 30 is responsive to a predetermined evaporator temperature being reached during a defrosting operation when the heater 20 is energized. The particular thermal switch 32 illustrated is a simple bimetallic switch positioned within the evaporator chamber attached to a portion of the evaporator 18. A dot-dash line 34 represents the thermal connection of the switch 32 with the evaporator 18. In this particular embodiment, the thermal switch 32 opens when the predetermined temperature is reached. A typical predetermined temperature is 50° F., although it will be appreciated that this may vary widely depending upon the particular refrigerator model and the precise location of the thermal switch 32 relative to the evaporator 18 and the heater 20.

The circuit 10 has two power circuits 36 and 38, each controlled by a triac, and each connected between the L and N supply conductors 12 and 14. The power circuit 36, hereinafter termed the compressor circuit 36, includes the compressor motor 16 and a triac 40 which is connected between a compressor motor terminal 42 and the L supply conductor 12. A neutral return conductor 44 connects the other terminal of the compressor motor 16 to the N supply conductor 14. It will be appreciated that the triac 40 comprises a switching element and, when gated, energizes the compressor motor 16.

The power circuit 38, hereinafter termed the defrost circuit 38, includes a triac 48, the heater 20, and the thermal switch 32, all connected in series between the L supply conductor 12 and the N supply conductor 14. In this particular circuit, it is important that the thermal switch 32 is the last of the three series elements before the N supply conductor 14. It will be appreciated that so long as the evaporator temperature is less than the predetermined temperature the thermal switch 32 is closed, and energization of the heater 20 occurs whenever the triac 48 is gated.

In order to sense the opening of the thermal switch 32 upon reaching of the predetermined evaporator temperature, there is provided a level conversion network 50 which functions to output a logic high voltage level on an output line 52 whenever an AC voltage appears at a node 54 between the heater 20 and the thermal switch 32, the AC voltage being referenced to the N supply conductor 14. A conductor 56 supplies the level conversion network 50 with the voltage appearing at the node 54, and a reference conductor 58 supplies a neutral reference level. It will be appreciated that the output line 52 goes high whenever the triac 48 is calling for energization of the heater 20 and the thermal switch 32 is open. When the triac 48 is OFF or when the contacts of the thermal switch 32 are closed, then no AC voltage appears at the node 54 and the output line 52 goes low. The level conversion network 50 may comprise any suitable rectifying and filtering arrangement, together with suitable voltage dropping resistors arranged to provide output magnitude and polarity compatible with the logic levels employed in the remainder of the circuit.

An important element of the circuit 10 is a timing and memory circuit 60 which functions to accumulate the time required for the heater 20 to raise the temperature of the evaporator 18 to the predetermined temperature (heater ON time), to convert this time to a corresponding interval before the next defrosting operation, and to time the interval before the next defrosting operation and to initiate the next defrosting operation at the end of the interval. Additionally, the timing and memory circuit 60 has provisions to accept a signal from a compressor ON time override circuit 62 to establish a relatively shorter interval before the next defrosting operation in the event the compressor 16 and thus the evaporator 18 are energized for more than a predetermined length of time during a single continuous operation.

More particularly, in the illustrated embodiment, the timing and memory circuit 60 comprises a four-bit binary up counter 64 having a clock (C) input 65 and four output lines collectively designated 66. A signal appearing on the output lines 66 is a binary representation of accumulated heater ON time. To convert the time signal appearing on the output lines 66 to a binary representation of that time interval before the next defrosting operation which corresponds to the total heater ON time, a decoding array 68 is provided. The decoding array 68 may comprise any suitable gating network, for example a conventional diode matrix. The output lines of the decoding array 68 are collectively designated 70. Lastly, the timing and memory circuit 60 has a preset and down binary counter 72 which, when strobed by a logic high appearing on a strobe (S) input 74, accepts the binary time signal appearing on the lines 70 and then counts down in response to pulses at a clock (C) input 76 to time the interval before the next defrosting operation. The preset and down counter 72 has an output 78 which provides a logic high when the counter 72 has counted to its terminal state.

Although the timing and memory circuit 60 is referred to as having an up counter and a down counter, it will be appreciated that such designations are arbitrary and for convenience only as various binary counting schemes are known. It will further be appreciated that any particular state of a digital counter may comprise its terminal state at which an output is produced.

To better illustrate one example of the timing and memory circuit 60 and the operation thereof, the following Table shows the various counting states of the counters 64 and 72, together with the particular defrost intervals which correspond to particular defrost heater ON times. In this example, the counters 64 and 72 are straight binary counters.

TABLE

| Up Counter 64 | | Preset and Down Counter 72 | |
|---|---|---|---|
| Heater ON Time in Minutes | Binary Time Representation | Interval before Next Defrost in Hours | Binary Time Representation |
| 0 | 0000 (Rest) | 12 | 1100 |
| 1 | 0001 | 12 | 1100 |
| 2 | 0010 | 12 | 1100 |
| 3 | 0011 | 12 | 1100 |
| 4 | 0100 | 12 | 1100 |
| 5 | 0101 | 12 | 1100 |
| 6 | 0110 | 12 | 1100 |
| 7 | 0111 | 12 | 1100 |
| 8 | 1000 | 12 | 1100 |
| 9 | 1001 | 12 | 1100 |
| 10 | 1010 | 11 | 1011 |
| 11 | 1011 | 10 | 1010 |
| 12 | 1100 | 9 | 1001 |
| 13 | 1101 | 8 | 1000 |
| 14 | 1110 | 7 | 0111 |
| 15 | 1111 | 6 | 0110 |
| | | 5 | 0101 |
| | Count Down Only | 4 | 0100 |
| | | 3 | 0011 |
| | | 2 | 0010 |
| | | 1 | 0001 |
| | | 0 | 0000 (Terminal State) |

For the four-bit up counter 64, it can be seen that as one-minute clock pulses are applied to the clock input 65, the counter 64 counts up. The decoding array 68 converts the "binary time representation" in the "up counter 64" column to the "binary time representation" in the "preset and down counter 62" column. After this latter binary time representation is loaded into the preset and down counter 72 by a logic high on the strobe input 74, the counter 62 counts down in response to one-hour clock pulses applied to its clock input 76, until such time as its zero (or terminal) state is reached. At this point, the output 78 goes high.

To gate the triacs 40 and 48 and thus to alternately energize the compressor motor 16 and the heater 20, there is provided a control flip-flop 80 of the reset-set (RS) type. The Q output of the control flip-flop 80 is connected through a line 82 to the gate 84 of the triac 48 which controls the heater 20. To control the compressor 16, the Q̄ output of the flip-flop 80 is connected through a line 85 to a lower input 86 of an AND gate 88. The output 90 of the AND gate 88 is connected to the gate 92 of the triac 40.

For thermostatic control of the compressor motor 16, a logic high voltage level source 94 is connected to one terminal 96 of the thermostatic control switch 24, and the other terminal 98 of the thermostatic control switch 24 is connected to an upper input 100 of the AND gate 88. Thus, whenever the AND gate 88 is enabled by a logic high on the lower input 86, signals from the thermostatic control 22 effectively gate the triac 40 to turn the compressor motor 16 ON and OFF as required to maintain the temperature in the refrigerated compartment 26.

To set the control flip-flop 80 when the preset and down counter 72 reaches a count of zero (meaning the defrost interval has expired and it is time for another defrosting operation), the output line 78 of the preset and down counter 72 is connected through a one shot 102 to the set (S) input 104 of the flip-flop 80.

In order to provide timing control signals, a clock 106 which outputs one pulse per minute on an output line 108 is provided. The output line 108 is connected to the clock (C) input of a divide-by-sixty scaler 110 which provides an output pulse at its output 112 once per hour. The scaler 110 additionally has a reset (R) input 114 which, when pulsed with a logic high, causes the scaler 110 to reset to a count of zero.

One minute pulses for the four-bit binary up counter 64 are gated through an AND gate 116 having the clock output line 108 applied to its middle input 118. To enable the AND gate 116 and thus the supplying of one-minute pulses to the clock input 65 of the counter 64, there is a second control flip-flop 120, also of the RS type. The Q output of the flip-flop 120 is connected to the upper input 122 of the AND gate 116. To prevent the four-bit binary up counter 64 from accumulating a count greater than fifteen, even if the heater 20 happens to be ON for more than fifteen minutes, a four-input NAND gate 124 has its inputs connected to the output lines 66. When the counter 64 reaches a count of fifteen (binary 1111), the NAND gate 124 is enabled, and its output 126 goes low. The output 126 of the NAND gate 124 is applied to the lower input 128 of the AND gate 116. Thus, when the NAND gate 124 is activated, the logic low applied to the lower input 128 deactivates the AND gate 116, inhibiting clock pulses to the four-bit up counter 64.

Clock pulses for the preset and down binary counter 72 are gated through an AND gate 130. The upper input of the AND gate 130 is connected to the one pulse per hour output 112 of the scaler 110, and the lower input of the AND gate 130 is connected to the $\bar{Q}$ output of the control flip-flop 80.

Referring again to the second control flip-flop 120, the set (S) input 132 is connected to the output of a one shot 134 which, in turn, has its input connected to the line 82 from the Q output of the control flip-flop 80. The reset (R) input 136 of the flip-flop 120 is connected to the output 138 of a one shot 140. The input of the one shot 140 is connected to the output line 52 of the level conversion network 50.

To complete this portion of the circuit, the output 138 of the one shot 140 is also connected through an OR gate 142 to the strobe input 74 of the preset and down counter 72. To provide for a twelve-minute "dwell time" between the opening of the thermal switch 32 and re-energizing of the compressor 16, a time-delay element 144 has its input also connected to the output line 52 of the level conversion network 50, and its output 146 connected through a one-shot 148 to the reset (R) input 149 of the flip-flop 80. The output 146 of the time delay element 144 goes high twelve minutes after its input goes high, and returns to low immediately when the input goes low.

Although not shown in the drawing, it will be appreciated that, to ensure that operation begins in a desired mode when power is first applied, it is good practice to include a "power on reset" circuit such as is conventionally included in digital logic systems. For example, a one shot may be connected to sense the initial application of DC supply voltage to the digital logic circuit elements, and to output a momentary logic high to reset the control flip-flop 80.

To explain the operation of the portion of the circuit 10 thus far described, it will be assumed that initially the control flip-flop 80 is in its reset state, $\bar{Q}$ is high, the AND gate 88 is enabled so that the thermostatic control switch 24 operates the compressor 16 as required, and the preset and down counter 72 is counting down one count per hour to a count of zero. When the counter 72 reaches a count of zero, the output 78 goes high, the output of the one shot 102 goes high, and the flip-flop 80 is set. The Q output of the flip-flop 80 goes high, gating the triac 48 to energize the defrost circuit 38, and the $\bar{Q}$ output goes low, disenabling the AND gate 88 and inhibiting further operation of the compressor 16. At the same time, the output of the one shot 134 goes high, setting the flip-flop 120. The Q output of the flip-flop 120 goes high, enabling the AND gate 116 to pass one-minute pulses to the clock input 65 of the four-bit up counter 64. At this point, the four-bit up counter is accumulating heater ON time in minutes.

When the heater 20 has raised the evaporator temperature to the predetermined temperature, the thermal switch 32 opens. An AC voltage appears at the node 54, and the output 52 of the level conversion network 50 goes high. This triggers the one shot 140 and additionally begins the twelve-minute time delay of the time delay element 144. The output 138 of the one shot 140 goes high, resetting the flip-flop 120 to inhibit clock pulses for the four-bit up counter 64. The high at the output 138 of the one shot 140 additionally passes through the OR gate 142 to strobe the preset and down counter 72. The preset and down counter 72 then receives the preset interval count from the decoding array 68.

No further activity takes place until the expiration of the twelve-minute defrost dwell time set by the time delay element 144.

At the expiration of the twelve-minute time delay, the output line 146 goes high, and the output of the one shot 148 goes high. This resets the flip-flop 80 and resets the scaler 110. Since the $\bar{Q}$ output of the flip-flop 80 is now high, energization of the compressor motor 16 is again permitted. The Q output of the flip-flop 80, being low, prevents gating of triac 48 which prevents re-energization of the heater 20 when the thermal switch 32 cools and closes.

The lower input of the AND gate 130 is high because it is connected to the $\bar{Q}$ output of the control flip-flop 80, and the AND gate 130 thus passes one hour pulses from the scaler 110 to the clock input 76 of the preset and down counter 72. At this point, the operation cycle continues, beginning again with the initial state assumed above.

In the above-described operation cycle, it will be appreciated that the defrost heater ON time is measured by the four-bit up counter 64, decoded by the array 68, and used to preset the counter 72. From the Table, it can be seen that the relationship is an inverse one, in that the interval before each defrosting operation is inversely related to the time required for the heater 20 to raise the temperature of the evaporator 18 to the predetermined temperature. As previously mentioned, the heater ON time is directly related to the amount of frost buildup on the evaporator. Thus, the interval before the next defrosting operation is selected on the assumption that the rate of frost buildup will be similar in the future.

The portion of the circuit 10 which implements the compressor ON time override will now be considered. As previously mentioned, the compressor ON time override circuit 62 is provided for this purpose. The function of the compressor ON time override circuit is to accumulate time each time the compressor motor 16 is operated continuously, and to output a logic high on an output line 150 whenever the compressor 16 operates for more than a predetermined length of time during any single operation. In the illustrated embodiment, this length of time is selected to be one hour, although it will be appreciated that it may be varied as desired for a particular refrigerator model.

The compressor ON time override circuit 62 comprises a divide-by-sixty scaler 152 having its clock (C) input connected to the output of an AND gate 154. The lower input of the AND gate 154 is connected to the one-pulse-per-minute clock output line 108, and the upper input of the AND gate 154 is connected to the output 90 of the AND gate 88, which goes high whenever the triac 40 is to be gated and the compressor 16 energized. Lastly, a one shot 156 is connected between the upper input of the AND gate 154 and a reset (R) input of the scaler 152.

Thus, every time the AND gate 88 is enabled and the compressor 16 turned ON, the AND gate 154 is enabled and clock pulses are supplied to the clock input of the scaler 152. Additionally, the one shot 156 initially resets the scaler 152.

The output line 150 of the compressor ON time override circuit 62 is connected to the upper input of an AND gate 158 which has its output connected to a preload (P) input 160 of the decoding array 68. The internal arrangement of the decoding array 68 is such that it outputs, on the output lines 70, a binary code corresponding to a relatively short interval before the next defrosting operation, in this case six hours, in response to a logic high on the preload input 160. Additionally, the output of the AND gate 158 is connected through the OR gate 142 to the strobe input 74 of the preset and down counter 72, to cause the preset and down counter 72 to receive the time interval from the decoding array 68.

In order to prevent presetting of the down counter 72 to six hours in the event that it has already reached a count less than six hours, a decoding gate 162 is connected to a set of output lines, collectively designated 164, of the preset and down counter 72. The arrangement of the decoding gate 162 is such that it produces a logic low output on an output line 166 in the event the count in the preset and down counter 72 is already six or less. The output line 166 is connected to the lower input of the AND gate 158.

In the operation of the compressor ON time override, whenever the compressor running time exceeds one hour during any single operation, the scaler 152 accumulates a count of sixty and the output line 150 goes high. Assuming the lower input of the AND gate 158 is high, the output of the AND gate 158 goes high. This places a high on the preload input 160 of the decoding array 68, setting up a six-hour time interval on the output line 70. At the same time, the OR gate 142 passes a logic high through to the strobe input 74, allowing the preset and down counter 72 to receive the new time. The preset and down counter 72 counts down as before, only this time with a decreased interval before the next defrosting operation.

In the event the preset and down counter has already counted to less than six hours, the decoding gate 162 and the AND gate 158 inhibit the signal from the compressor ON time override circuit 62, and the next defrosting operation occurs on schedule. Presumably, a large amount of frost will have been built up on the evaporator 18, resulting in a relatively long heater ON time, and consequent relatively short interval before the next successive defrosting operation.

It will therefore be appreciated that there has been provided a demand defrost control system and method which uses the heater ON time for a prior defrost operations to determine the interval before the next defrosting operation. Additionally, there has been provided an override feature responsive to the continuous operation of the compressor during any single operation of the compressor.

Although the present invention has been described as a complete defrost control system, it will be appreciated that the invention may be utilized as a portion of a more comprehensive defrost control system which takes other parameters, such as accumulated compressor run time, into account, and the claimed invention is intended to cover such an application.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An automatically-defrosting refrigeration apparatus including a refrigerant evaporator, a heater for defrosting said evaporator, and a demand defrost control system, said demand defrost control system comprising:

means for de-energizing said evaporator and for energizing said heater upon initiation of a defrosting operation;
   a thermal sensor responsive to a predetermined evaporator temperature being reached during a defrosting operation; and
   means for establishing varying intervals between successive defrosting operations and for initiating a defrosting operation at the end of an interval, said means for establishing and initiating including:
   timer means responsive to the energization of said heater and to said thermal sensor for measuring the time required for said heater to raise the evaporator temperature to the predetermined temperature;
   the interval before each defrosting operation being inversely related to the time required for said heater to raise the evaporator temperature to the predetermined temperature during at least the last previous defrosting operation.

2. A refrigeration apparatus according to claim 1, which further includes a compartment cooled by said evaporator and a thermostatic control for cycling said evaporator ON and OFF as required to maintain a set temperature in said compartment, and wherein said demand defrost control system further comprises:

an override means responsive to the continuous operation of said evaporator for more than a predetermined length of time and effective to shorten the interval before the next defrosting operation.

3. A refrigeration apparatus according to claim 1, wherein said demand defrost control system further comprises:

means for de-energizing said heater when the predetermined evaporator temperature is reached.

4. In an automatically-defrosting household refrigeration apparatus including a refrigerant evaporator, a compartment cooled by said evaporator, a thermostatic control for cycling said evaporator ON and OFF as required to maintain a set temperature in said compartment, and a predictive demand defrost system which periodically defrosts said evaporator at varying intervals, an override means for said demand defrost system which comprises:

means responsive to the continuous operation of said evaporator for more than a predetermined length of time and effective to shorten the interval before the next defrosting operation.

5. A method of controlling the interval between successive defrosting operations in a refrigeration apparatus, which method comprises:

initiating a defrosting operation by de-energizing the refrigerant evaporator and energizing an evaporator heater;
   sensing the temperature of the evaporator during the defrosting operation;
   measuring the time required for the heater to raise the evaporator temperature to a predetermined temperature; and
   establishing the interval before the next defrosting operation based at least in part on the measured time, the interval before the next defrosting operation being inversely related to the measured time.

6. The method of claim 5, which further comprises the steps of:

determining the length of time the evaporator operates continuously in response to the refrigerator thermostatic temperature control to cool a refrigerated compartment; and
   shortening the interval before the next defrosting operation in the event the length of time so determined exceeds a predetermined length of time.

* * * * *